W. J. NICHOLSON.
CORN-PLANTERS.

No. 193,719. Patented July 31, 1877.

WITNESSES:
H. Rydquist
J. H. Scarborough

INVENTOR:
W. J. Nicholson.
BY
ATTORNEYS

UNITED STATES PATENT OFFICE.

WILLIAM J. NICHOLSON, OF PAOLA, KANSAS.

IMPROVEMENT IN CORN-PLANTERS.

Specification forming part of Letters Patent No. 193,719, dated July 31, 1877; application filed April 9, 1877.

*To all whom it may concern:*

Figure 1:
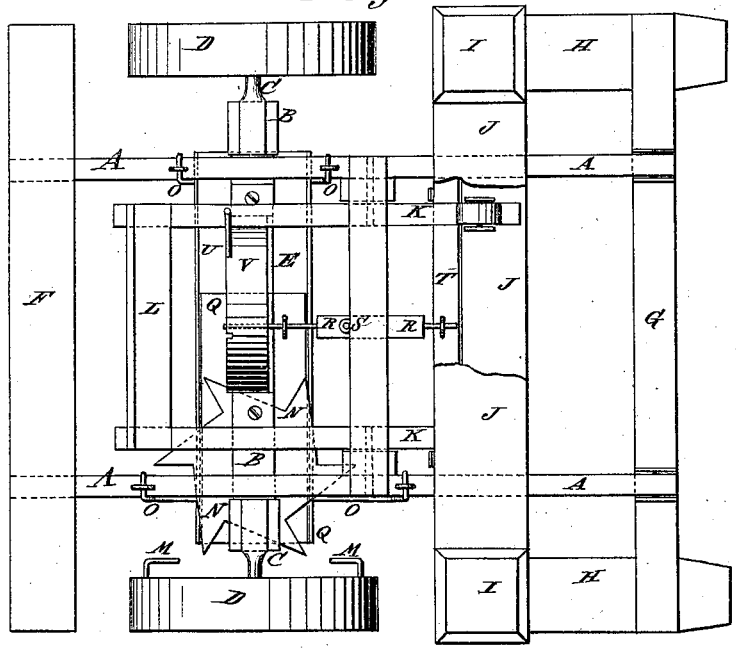
Figure 2:
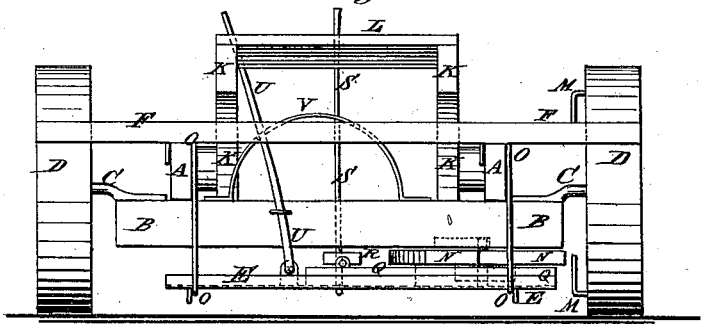
Figure 3:
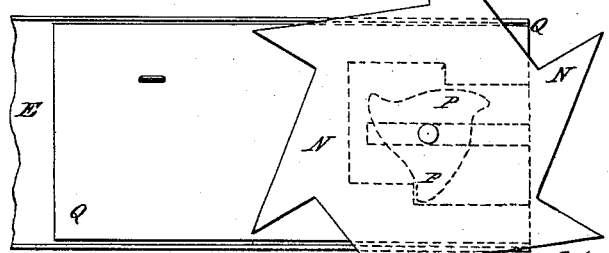

Be it known that I, WILLIAM JOHNSON NICHOLSON, of Paola, in the county of Miami and State of Kansas, have invented a new and useful Improvement in Self-Dropping Corn - Planter, of which the following is a specification:

Figure 1 is a top view of my improved planter, part being broken away to show the construction. Fig. 2 is a rear view of the same. Fig. 3 is a detail view of the device for operating the dropping-slide.

Similar letters of reference indicate corresponding parts.

The object of this invention is to furnish an improved corn-planter, which shall be so constructed that the slide may be operated to drop the seed by the advance of the machine, and which shall be simple in construction and reliable in operation.

The invention will first be described in connection with the drawing, and then pointed out in the claims.

D D are the wheels, which revolve upon the journals C, attached to, or formed upon, the ends of the axle B.

To the axle B, near its ends, are attached two bars, A, to the rear ends of which is attached the seat-board F.

To the forward ends of the bars A is hinged a cross-board, G, to the ends of which are attached the forward ends of the runners H, by which a channel is opened to receive the seed.

With the rear ends of the runners H are connected the hoppers I, which are connected by cross-boards J. To the lower cross-board J are hinged the forward ends of two levers, K, which are pivoted to the long bars A, and the rear ends of which are connected by a cross-bar, L, so that by operating the said levers K, the runners H may be raised from the ground when desired.

As thus far described there is nothing new in the construction.

To the inner side of one of the wheels D are attached arms or blocks M, which should be detachable, so that the distance apart of the hills may be regulated by varying the number of the said arms or blocks.

As the wheel D revolves, the arms or blocks M strike against the teeth of the wheel N and revolve it. The upper end of the journal of the wheel N revolves in a groove in the lower side of the axle B, and its lower end revolves in a hole in a board or plate, E, which rests in stirrups O, attached to the long bars A.

To the lower side of the toothed wheel N is attached a cam-wheel, P, made with three (more or less) cams, and which enters a recess in a plate, Q, placed upon the plate or board E.

The recess in the board or plate Q is made with two shoulders, as shown in dotted lines in Fig. 3, so that the plate Q may be slid back and forth by the revolution of the cam-wheel P.

To the sliding plate Q is pivoted the rear end of a lever, R, which is pivoted to a rod, S, attached to the frame of the machine, and which serves as a fulcrum for the said lever R.

The forward end of the lever R is pivoted to the dropping-slide T, so that the seed may be dropped by the vibration of the said lever R.

The rod S has an up-and-down movement, so that it may be raised to lift the board or plate E, and allow it to be moved longitudinally to throw the wheel N into and out of gear with the arms or blocks M of the wheel D.

U is a lever, pivoted to the axle B, and the lower end of which is pivoted to the board or plate E, so that the board or plate E may be moved back and forth by operating the said lever U.

The upper part of the lever U moves along the edge of a curved bar, V, the ends of which are attached to the axle B, and in the edge of which are formed two notches, to hold the said lever U in either position.

Having thus described my invention, I claim as new and desire to secure by Letters Patent—

1. The combination of the stirrups O and the plate E, for supporting the slide Q, the cam-wheel P, and the toothed wheel N, substantially as herein shown and described.

2. The combination, with cam-wheel P, of the plate Q, having double-shouldered recess, the lever R, rod S, and dropper-slide T, as shown and described, for the purpose specified.

WILLIAM JOHNSON NICHOLSON.

Witnesses:
JOHN HOWARD,
S. D. CONDON.